United States Patent [19]

Svoboda

[11] Patent Number: 4,970,617
[45] Date of Patent: Nov. 13, 1990

[54] CLEANING DEVICE FOR TAPE IN A CASSETTE

[76] Inventor: Bill W. Svoboda, P.O. Box 2026, Glen Ellyn, Ill. 60138

[21] Appl. No.: 184,959

[22] Filed: Aug. 1, 1988

[51] Int. Cl.⁵ .............................................. G11B 23/02
[52] U.S. Cl. ............................... 360/132; 15/DIG. 13
[58] Field of Search ....................... 360/128, 132, 137; 15/DIG. 12–DIG. 13

[56] References Cited

U.S. PATENT DOCUMENTS 3,767,210 10/1973 Havens ........................... 360/128 X Primary Examiner—A. J. Heinz

[57] ABSTRACT

A device which is mounted on a video cassette body, under the dust cover, for the purpose of cleaning the video tape.

1 Claim, 1 Drawing Sheet

U.S. Patent    Nov. 13, 1990    4,970,617
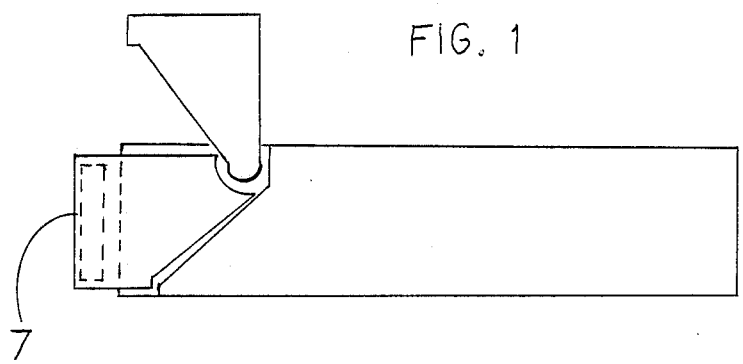
FIG. 1
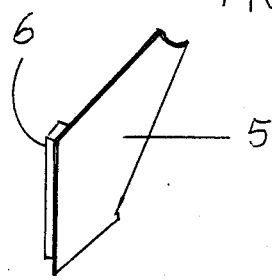
FIG. 2a
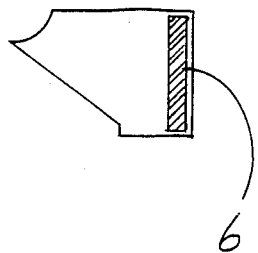
FIG. 2b
FIG. 3
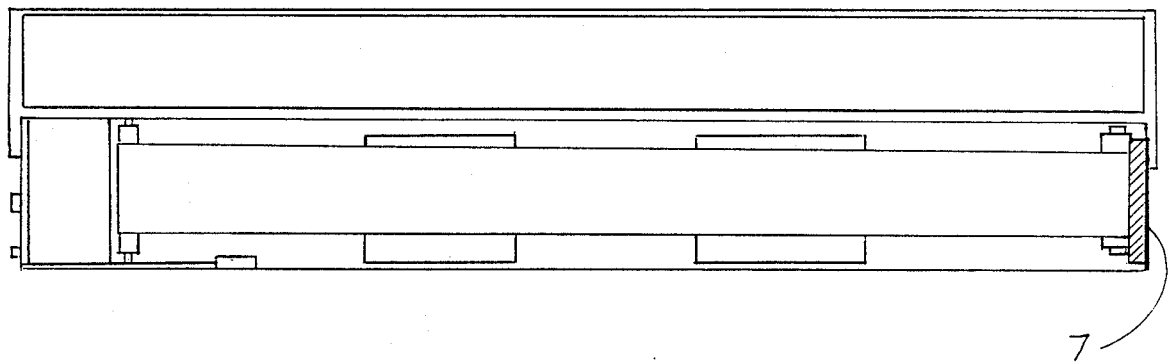

CLEANING DEVICE FOR TAPE IN A CASSETTE

BACKGROUND OF THE INVENTION

A video tape cleaning device is needed that will protect a video tape player from tapes that have been exposed to dust, dirt and high humidity. This device will clean the tape as it runs through the player but before the tape comes in contact with the tape player's head. It can be easily attached and removed, and is disposable.

SUMMARY OF THE INVENTION

This cleaning device will adhere to a video tape cassette and make contact with the tape as it is drawn from the cassette. The adhesive part of the device is attached to the video cassette under the dust cover on the side opposite the push button to open the dust cover. The device is designed to match the shape of the cassette. The dust cover partially closes on the device. The cassette is then inserted into the VCR.

DESCRIPTION OF THE DRAWINGS

FIG. 1 is a side view of a video cassette with the cleaning device in place.

FIG. 2a is a perspective view of the cleaning device.

FIG. 2b is a side view of the cleaning device.

FIG. 3 is a front view of a video cassette with the cleaning device in place. It illustrates the device in use as the tape is routed from the cassette through the video player back to the cassette.

DESCRIPTION OF THE PREFERRED EMBODIMENT

The invention, the cleaning device, is referred to generally in FIG. 1 and FIG. 3 by the reference #7 and is shown attached to the side of a video cassette.

The device is made up of two components; a plastic, paper or; wood body (shown on FIG. 2a as reference #5) and a cotton or fiber cleaning pad (reference #6) layered one on the other by adhesive and has no moving parts. It is attached to the cassette under the dust cover at the point where the tape leaves the cassette to be played (shown in FIGS. 1 and 3) by the use of an adhesive made up of a film of non-liquid glue, making the device sticky on the surface of the body opposite the surface of the cassette to which the device is attached.

When the dust cover is closed, the cleaning pad is held in place against the tape by the VCR tape guide, causing the cleaning pad to float or lightly rub against the tape, dragging away lose lint and dust.

The device can be easily removed by opening the dust cover lon the video cassette and pulling the device off. Accordingly, the cleaning device can be easily attached and removed so that it can be replaced or used only when needed.

While the various materials and construction of the two components and mounting/adhering feature have been specifically illustrated, it will be apparent to those skilled in the art that modifications and variations of both materials and construction may be made without departing from the subject matter of the invention.

I claim:

1. A video cassette tape cleaning device which will clean a tape as it runs through the video cassette player, before the tape comes in contact with the tape player's head, such device comprising a support body and a cleaning pad affixed thereto, said device being attached to the cassette under the video cassette dust cover at a point where the tape leaves the cassette to be played, said device being held in place against the tape by the VCR tape guide causing the cleaning pad to float or lightly rub against the magnetically coated side of the tape, dragging away lose lint and dust, but which device can be easily removed or replaced by reopening the dust cover and pulling off or reattaching the device.

* * * * *